US009524454B2

(12) United States Patent
Metz et al.

(10) Patent No.: US 9,524,454 B2
(45) Date of Patent: Dec. 20, 2016

(54) PRODUCT SURFACE INCLUDING AN OPTOELECTRONICALLY READABLE CODE

(71) Applicant: Benecke-Kaliko AG, Hannover (DE)

(72) Inventors: Markus Metz, Neustadt/Ortsteil Bordenau (DE); Christian Neumann, Hildesheim (DE); Benjamin Jungbluth, Hannover (DE)

(73) Assignee: Benecke-Kaliko AG, Hannover (DE)

( * ) Notice: Subject to any disclaimer, the term of this patent is extended or adjusted under 35 U.S.C. 154(b) by 0 days.

(21) Appl. No.: 15/138,060

(22) Filed: Apr. 25, 2016

(65) Prior Publication Data

US 2016/0239734 A1    Aug. 18, 2016

Related U.S. Application Data

(63) Continuation of application No. PCT/EP2014/066594, filed on Aug. 1, 2014.

(30) Foreign Application Priority Data

Oct. 24, 2013  (DE) .................. 10 2013 221 660
Nov. 19, 2013  (DE) .................. 10 2013 223 566

(51) Int. Cl.
  *G06K 19/06*  (2006.01)
  *B60C 13/00*  (2006.01)
  *B65G 15/30*  (2006.01)

(52) U.S. Cl.
  CPC ....... *G06K 19/06037* (2013.01); *B60C 13/001* (2013.04); *B65G 15/30* (2013.01);
  (Continued)

(58) Field of Classification Search
  USPC .......................... 235/487, 491, 494
  See application file for complete search history.

(56) References Cited

U.S. PATENT DOCUMENTS 4,625,101 A    11/1986   Hinks et al.

FOREIGN PATENT DOCUMENTS

| CA | 2 311 960 A1 | 1/2001 |
| DE | 33 33 149 A1 | 3/1985 |
| WO | 97/36258 A1 | 10/1997 |

OTHER PUBLICATIONS

International Search Report dated Nov. 10, 2014 of international application PCT/EP2014/066594 on which this application is based.
(Continued)

*Primary Examiner* — Jamara Franklin
(74) *Attorney, Agent, or Firm* — Walter Ottesen, P.A.

(57) ABSTRACT

A product surface including a first optoelectronically readable code formed by an arrangement of planar cells of a first and a second cell type. The code has a large detectable region and the readability thereof is robust in relation to demands during the production and/or the use of the surface. The cells, as integral components of the surface, have a surface profile. An intensity difference $\Delta I = I_2 - I_1$ in the intensity $I_2$ reflected by the surface profile of the second cell type and intensity $I_1$ reflected by the surface profile of the first cell type results in the case of light incidence as a result of the configuration of the surface profiles. The surface has a second code. The maximum of the absolute intensity difference $|\Delta I_1|$ of the first code lies in a different reflection direction than the maximum of the absolute intensity difference $|\Delta I_2|$ of the second code.

19 Claims, 8 Drawing Sheets

(52) U.S. Cl.
CPC ............... *G06K 19/06159* (2013.01); *G06K 2019/06271* (2013.01)

(56) References Cited

OTHER PUBLICATIONS

Translation of the Written Opinion of the International Searching Authority dated Mar. 2, 2016 of international application PCT/EP2014/066594 on which this application is based.

PRODUCT SURFACE INCLUDING AN OPTOELECTRONICALLY READABLE CODE

CROSS REFERENCE TO RELATED APPLICATIONS

This application is a continuation application of international patent application PCT/EP2014/066594, filed Aug. 1, 2014, designating the United States and claiming priority from German application 10 2013 221 660.2, filed Oct. 24, 2013, and German application 10 2013 223 566.6, filed Nov. 19, 2013 and the entire content of the above applications is incorporated herein by reference.

FIELD OF THE INVENTION

The invention relates to a product surface including a first optoelectronically readable code, which is formed by an arrangement of two-dimensional cells of a first cell type and two-dimensional cells of a second cell type.

BACKGROUND OF THE INVENTION

With an optoelectronically readable code, it is possible to present information on a product in a simple manner. Examples of this are a product number represented by a barcode or an Internet address (uniform resource locator) represented via a QR code, which, for example, directs to an Internet site of the product producer. Here, the cell types of such codes must be sufficiently different in terms of their optical contrast such that the cells can be detected and distinguished by an optoelectronic reader. Usually, a code has two cell types, which differ in terms of the color thereof, for example by way of the hue and/or the saturation and/or the brightness thereof. What emerges from this is an optical contrast in the brightness or intensity of the light reflected by the cells of the different cell types, which can be detected by an optoelectronic reader and used for distinguishing between the cell types. On account of the high optical contrast, the combination of black and white cells is a conventional representation in this case. Usually, such codes are attached onto the product surface in the form of an additional colored layer during or after the production of the product.

Here, a "code" is understood to mean the imaging of data using symbols. A "cell" is a two-dimensional region, which, as a result of the optical appearance and/or geometric form thereof and/or together with further cells, represents such a symbol. Two cells of one cell type have a similar optical appearance and/or geometric form. Two cells of different cell types differ significantly in terms of the optical appearance and/or the geometric form thereof. An "optoelectronically readable" code can be detected by an optoelectronic reader and can be decoded and interpreted via appropriate software.

CA 2311960 C has disclosed a vehicle pneumatic tire and a method for the production thereof, which has a rubber label with a barcode made of ink or printing ink on the surface of the tire sidewall. During the production of the vehicle pneumatic tire, the rubber label is applied to the surface of the unvulcanized vehicle pneumatic tire and vulcanized together with the latter.

The use of a layer made of different materials and/or colors to the material and/or the color of the product surface on the product surface can have a negative effect on the overall impression of the product in the eyes of an observer. Moreover, the readability of such a code is restricted by, for example, the demands on the other materials and/or colors during the production and/or the use of the product. This can occur as a result of expansion or the action of heat during the production or discoloration by solar irradiation or the layer detaching in the case of mechanical load during use of the product. Especially in large production numbers, it is moreover complicated and expensive to provide each individual product with an additional layer. Therefore, there is an endeavor to be able to apply the code on the product surface in a more cost-effective and simple manner.

SUMMARY OF THE INVENTION

It is an object of the invention to provide a product surface which has a code which is optoelectronically readable, which has a large detectable range and the readability of which is robust in relation to demands during the production and/or the use of the product surface and which can be produced in a cost-effective manner.

The object is, for example, achieved
- by virtue of the cells being an integral component of the product surface,
- by virtue of the cells of each cell type respectively having a surface profile,
- by virtue of the surface profile of at least one cell type having at least one elevation and/or depression relative to the product surface,
- by virtue of the surface profile of the first cell type being embodied relative to the surface profile of the second cell type in such a way that the reflection properties of the surface profile of the first cell type differ from the reflection properties of the surface profile of the second cell type, as a result of which an intensity difference $\Delta I = I_2 - I_1$ emerges in the intensity $I_2$ reflected by the surface profile of the second cell type and the intensity $I_1$ reflected by the surface profile of the first cell type when light is incident,
- by virtue of the product surface having a second code embodied thus,
- by virtue of the surface profiles of the cell types of the first code being embodied in relation to the surface profiles of the cell types of the second code in such a way that the maximum of the absolute intensity difference $|\Delta I_1|$ of the first code lies in a different direction of reflection to the maximum of the absolute intensity difference $|\Delta I_2|$ of the second code.

What is important is that the two cell types of each of the two codes differ from one another in terms of the intensity of the light reflected by the surface profiles of the two cell types on account of the different reflection properties of the surface profiles of the two cell types when light is incident. As a result of this, there is an intensity difference $\Delta I_c$ for each one of the two codes, where c=1 for the first code and c=2 for the second code. Cells of the different cell types with the same geometric dimensions underlie the establishment of the intensity difference. The intensity difference $\Delta I_c$ can be detected by an optoelectronic reader. Hence, the cells of different cell types can be distinguished and the code is readable via an optoelectronic reader.

The intensity difference $\Delta I_c$ is therefore not generated by a configuration with different colors and/or by different materials of the cell surfaces of different cell types but by a different configuration of the surface profiles of the cell types. To this end, the surface profile of at least one cell type of each code has at least one elevation and/or depression relative to the product surface.

The intensity difference $\Delta I_c$ of a code is dependent, inter alia, on the direction of the incident light and on the direction of reflection, that is, the direction of the reflected light. For each illumination situation there is a direction of reflection in which the difference between the intensities reflected by the surface profiles of the two cell types of the code is at a maximum, that is, there is a direction of reflection in which the absolute intensity difference $|\Delta I_c|$ of the code is at a maximum. An ideal detection result is obtained for this illumination situation by a detector of an optoelectronic reader which captures the light reflected in this direction of reflection. As a result of this, ideal optoelectronic reading of the code is made possible.

The product surface has two codes embodied thus in order to extend the range of ideal or good detectability. The codes differ in that the maximum of the absolute intensity difference $|\Delta I_1|$ of the first code lies in a different direction of reflection than the maximum of the absolute intensity difference $|\Delta I_2|$ of the second code. As a result of this, it is also possible to extend the detectable range. The detectable range comprises the directions of reflection in which the first code and/or the second code can be detected and read by an optoelectronic reader.

The "surface profile" of a cell type or the "surface profile" of the cells of a cell type characterizes the elevation(s) and/or depression(s) of the surface of the cells of the cell type. The surface profile comprises the density and/or height of the elevations and/or depressions of the surface and/or the orientation of the surface or portions of the surface.

The "reflection properties" characterize how light, which is incident on a surface, is cast back, that is, reflected, by the latter. The reflection properties are influenced by the surface profile of the surface and by the surface material. The reflection properties are influenced by effects such as absorption and/or reflection and/or shadowing, which are known to persons skilled in the art. The reflection is diffuse and/or specular. The intensity of the reflected light depends on the direction.

Surface profiles which differ in terms of their reflection properties differ in terms of characteristic features of the light reflected thereby. The light reflected by the cells of one cell type is therefore not necessarily identical in all features but it does have the same characteristic features, that is, the same reflection properties, which differ from the reflection properties of the cells of the other cell type. Accordingly, the elevations and/or depressions of different cells of one cell type are characterized by the surface profile, but they are not necessarily identical.

The combination of two cell types with surface profiles that have a different extent of absorption and/or with surface profiles in which one surface profile preferably exhibits specular reflection and the other surface profile preferably exhibits diffuse reflection and/or with surface profiles in which one surface profile preferably exhibits specular reflection in one direction and the other surface profile preferably exhibits specular reflection in a direction differing therefrom is particularly suitable for generating an intensity difference of a code.

As a person skilled in the art knows, the light reflected by a surface is also dependent on the direction, intensity and wavelength of the incident light. Within the scope of the invention, a sufficient light source is assumed. By way of example, this can be an active light source integrated into the optical reader or ambient light, such as sunlight or room lighting.

The "optoelectronic reader" comprises at least one detector for light. A reader which, like, for example, a barcode scanner, actively emits light and detects the light reflected back into the detector may serve as optoelectronic reader. It can also be an optoelectronic reader which, for example like a smartphone equipped with photo-optics and suitable software, detects light from the surroundings that is reflected into the detector from the surface of the code. The optoelectronic reader detects the intensity of the light reflected by the individual cells with a spatial resolution of at least the minimum cell dimension and it is sensitive to the intensity difference $\Delta I_c$ of the light reflected from the cells of differing cell types of a code. The cells are therefore detected and distinguished, as a result of which the code can be read optoelectronically. External interpretation software or interpretation software integrated into the optoelectronic reader decodes and interprets the information represented by the code. The detection mechanism and interpretation software can be matched to the requirements of the code integrated into the product surface.

"Light" should be understood to mean electromagnetic radiation that is suitable for detection by an optoelectronic reader. In particular, this should be understood to mean electromagnetic radiation with a wavelength from 380 nm to 780 nm.

The cells of the codes are an integral constituent of the product surface, that is, they are formed as a three-dimensional profile from the material of the product surface or of the product itself. The material of the product surface is matched to the demands during the production and/or use of the product. By way of example, the elastomeric material of the surface of a vehicle pneumatic tire caters for the high demands due to high temperatures during vulcanization. Hence, no general drop in the readability of the codes as a result of the demands during the production and/or the use of the product surface is to be expected. The readability of the codes is robust in relation to these demands and no additional complex and cost-intensive measures for protecting the readability of the codes are necessary.

Moreover, the complex and cost-intensive application of one or more additional layer(s) made of dye and/or other materials onto the product surface is dispensed with and the overall impression of the product surface in the view of the observer is not influenced by color and/or other materials on the product surface.

Hence, a cost-effective product surface is provided, the product surface having an optoelectronically readable code which has a large detectable range and the readability of which is robust in relation to demands during the production and/or the use of the product surface.

Depending on the reflection properties of the surface profiles of the cell types of a code, $\Delta I_c>0$ (that is, the intensity reflected by a cell of the second cell type is greater than the intensity reflected by a cell of the first cell type) may apply for specific combinations of direction of incidence and direction of reflection, whereas $\Delta I_c<0$ applies for other combinations of direction of incidence and direction of reflection.

Commercially available optoelectronic readers often only identify a detected intensity pattern as a code if a specific arrangement of cells of one cell type (of the second cell type in the following text) of the code are detected with a higher intensity than a specific arrangement of cells of the other cell type (of the first cell type in the following text) of the code. Therefore, such a code can only be identified and read by the optoelectronic reader for the combinations of direction of incidence and direction of reflection for which the intensity difference $\Delta I_c$ of the code is positive, that is, $\Delta I_c>0$.

In order to improve the range of the ideal detectability when using such optoelectronic readers, it is advantageous if the surface profiles of both cell types of the first code and the surface profiles of both cell types of the second code are embodied in such a way that the maximum of the positive intensity difference $\Delta I_1 > 0$ of the first code lies in a different direction of reflection than the maximum of the positive intensity difference $\Delta I_2 > 0$ of the second code. As a result of this, an extension of the detectable range can also be brought about.

An extension of the detectable range is achieved by virtue of the surface profiles of the cell types of the first code and of the second code being embodied in such a way that at least 50% of the possible angles of reflection, particularly preferably at least 80% of the possible angles of reflection, in which $\Delta I_1 \leq 0$ applies for the intensity difference $\Delta I_1$ of the first code, the intensity difference $\Delta I_2$ of the second code satisfies the condition $\Delta I_2 > 0$.

For a direction of reflection, for which the intensity difference $|\Delta I_c|$ of a code lies below the detector accuracy, the intensity difference of the code is evaluated as 0 in this case, that is, $\Delta I_c = 0$.

It is advantageous if both codes are one-dimensional codes, in particular barcodes, or two-dimensional codes, in particular quick response (QR) codes. In principle, any type of code which can be represented by cells of two cell types in a plane is suitable. In a preferred embodiment, a cell is represented by a circle, a circular disk, a bar, a rectangle or a square. In respect of two-dimensional codes, reference should be made, in particular, to stacked codes such as Codablock, Code 49 and PDF417 and matrix codes such as QR codes, the DataMatrix code, MaxiCode and Aztec code, as well as dot codes. QR codes also comprise developments such as the design QR code, micro QR code, secure QR code and iQR code.

It is also advantageous if the two codes at least partly represent the same information. What this ensures is that this information is detected by the optoelectronic reader if at least one of the codes is identified as such and read by the optoelectronic reader.

The two codes can also contain different information. Furthermore, they can differ in terms of the coding and/or the error tolerance thereof.

It is advantageous if the two codes are arranged adjacent to one another on the product surface. As a result of this, both codes can easily be positioned, either simultaneously or in succession, within the detection range of the optoelectronic reader. This simplifies simple and reliable detection and reading of at least one code by way of the optoelectronic reader. Moreover, the overall impression of the product surface occupied by the codes in view of the observer can be influenced by the targeted arrangement of the codes.

Corresponding advantages also emerge if the second code takes up a smaller area on the product surface than the first code and if the second code is integrated into the area of the first code. In this case, the first code can be a design QR code, which has the second code, for example also a QR code, within the area of the code.

An advantageous embodiment of the codes is provided by virtue of the cell types A, which comprise the first cell type of the first code and the second cell type of the second code, having the same surface profile and the cell types B, which comprise the second cell type of the first code and the first cell type of the second code, having the same surface profile. The surface profiles of the cell types of the two codes are therefore interchanged and $\Delta I_1 = -\Delta I_2$ applies (wherein the assumption is made in each case of areas of reflection with the same surface dimensions). Thus, what is ensured for $\Delta I_c \neq 0$ is that $\Delta I_c > 0$ applies for precisely one code for each angle of reflection or each angle of incidence. The detectability is therefore not restricted by an optoelectronic reader which only identifies a code as such in the case of the positive intensity difference.

In an advantageous embodiment, the surface profile of the cell types A is rotated by 90° in the plane of the product surface relative to the surface profile of the cell types B. If the surface profile of the cell types A has a preferred direction of reflection, this results in a preferred direction of reflection rotated by 90° for the surface profile of the cell types B. As a result of this, the intensity difference of the cell types of the codes is reliably ensured and these are optoelectronically readable.

It is advantageous if the surface profile of one cell type has elements which form a structure and/or a texture. The height of the elements can be regular or irregular. The term "structure" comprises the regular arrangement of elements such as regular hatching, that is, straight webs arranged parallel to one another, such as regular grids of elements or such as grating structures made of crossing webs. The term "texture" comprises an irregular distribution of elements which, however, appears largely homogenous, in particular a distribution of height and/or arrangement of the elements in accordance with a statistical distribution or noise. Such a surface profile enables targeted influencing of the characteristic reflection properties. By way of selecting, arranging and dimensioning the elements of the structure and/or the texture in a targeted fashion, it is possible to achieve predominantly specular reflection or predominantly diffuse reflection. The degree of absorption is increased by multiple reflection of the light at a plurality of elements. By way of the targeted combination of two cell types of a code with surface profiles having different structures and/or textures, it is possible to increase the difference in the reflected intensity of the cell types in a targeted manner and hence it is possible to optimize the optoelectronic readability of the code. A corresponding effect is obtained if cell types are combined, in which one cell type has a surface profile with a structure and/or texture and a different cell type has a surface profile without a structure or texture.

Preferably, the surface profile of at least one cell type of each code has a structure and/or texture. Preferably, at least the surface profiles of the cell types A have a structure and/or a texture.

Elements, the form of which is based on a web and/or a cylinder and/or a pyramid and/or a cone and/or a frustum and/or a conical frustum, are found to be expedient for targeted influencing of the reflection properties. It is also expedient if the surface of the elements has elevations and/or depressions, in particular a stepped structure. Such a structure increases the degree of absorption and/or diffusion.

It is expedient if the element tips of two adjacent elements have a distance between them of 0.01 mm to 0.8 mm and/or if elements of a surface profile of one cell type have a height difference of 0.08 mm to 0.5 mm. The height difference of an element is measured as a difference in the height between the element base and the element tip. Such dimensions are very well suited for manipulating the reflection properties of light, without the individual element standing out on the product surface to an observer.

It is also expedient if the surface profile of one cell type has regions with a roughness depth of at most 0.01 mm, preferably with a roughness depth of at most 0.008 mm. Such a region has a high reflection rate and/or characteristic reflection properties for light. Moreover, such a roughness depth corresponds to the conventional roughness depth of many product surfaces for production reasons. Preferably, the surface profiles of the cell types B have such a roughness depth.

Here, pursuant to DIN EN ISO 4287:1998, the "roughness depth" is the arithmetic mean of the individual roughness depths of successive individual sampling lengths. Here, the individual roughness depth is the maximum height difference within an individual sampling length. If the surface profile is largely made of elements, the roughness depth is the maximum of the roughness depth pursuant to DIN EN ISO 4287:1998 and the mean height difference of the elements.

It is advantageous if the surface profiles of the cell types of a code differ in terms of their roughness depth, more particularly if the ratio of the roughness depth of the surface profile of a cell type to the roughness depth of the surface profile of the other cell type is at least 15, more particularly at least 30. The reflection properties of such surface profiles are sufficiently different to provide a code readable by an optoelectronic reader. Preferably both codes satisfy this condition, with the surface profiles of the cell types A having a greater roughness depth than the surface profiles of the cell types B. In particular, the surface profiles of the cell types B may have a structure and/or texture.

It is expedient if cells have an additional height profile. This can be an inclination and/or curvature of the cell surface and/or a depression or elevation of the cell surface relative to the product surface, as a result of which the reflection properties are influenced. Lowering cell surfaces serves to protect against mechanical demands, such as scratching. Lowering or elevating cell surfaces can also increase the readability of the code by way of the shadowing accompanying it.

It is expedient if each code has a surface area from 1 cm$^2$ to 16 cm$^2$ on the product surface. However, the invention is also suitable for codes with a larger or smaller surface area.

Polymeric material, in particular an elastomeric material, is particularly suitable for a product surface according to the invention.

The use of the product surface is advantageous on the sidewall of a vehicle pneumatic tire. The sidewall is exposed to great demands during the production and during use. During the production, the elastomeric material is exposed to high temperature during the vulcanization process. During use, a vehicle pneumatic tire is exposed to great changes in weather, for example. The elastomeric material is adapted to these demands. The readability of the code which, as an integral constituent of the product surface, is made of this elastomeric material itself is robust against these demands.

The use of the product surface, in particular for the sidewall of a vehicle pneumatic tire, renders it possible to represent legal product information and/or optional information, in particular an Internet address, via the codes integrated into the product surface. As a result of this, a compact representation of this information is provided, which can be read via an optoelectronic reader. The Internet address can direct to an Internet site containing further information, in particular information about the product and/or the manufacturer and/or assembly and/or use instructions.

Similar advantages emerge when using the product surface on a conveyor belt, for example at a position which is not permanently loaded by bulk material.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
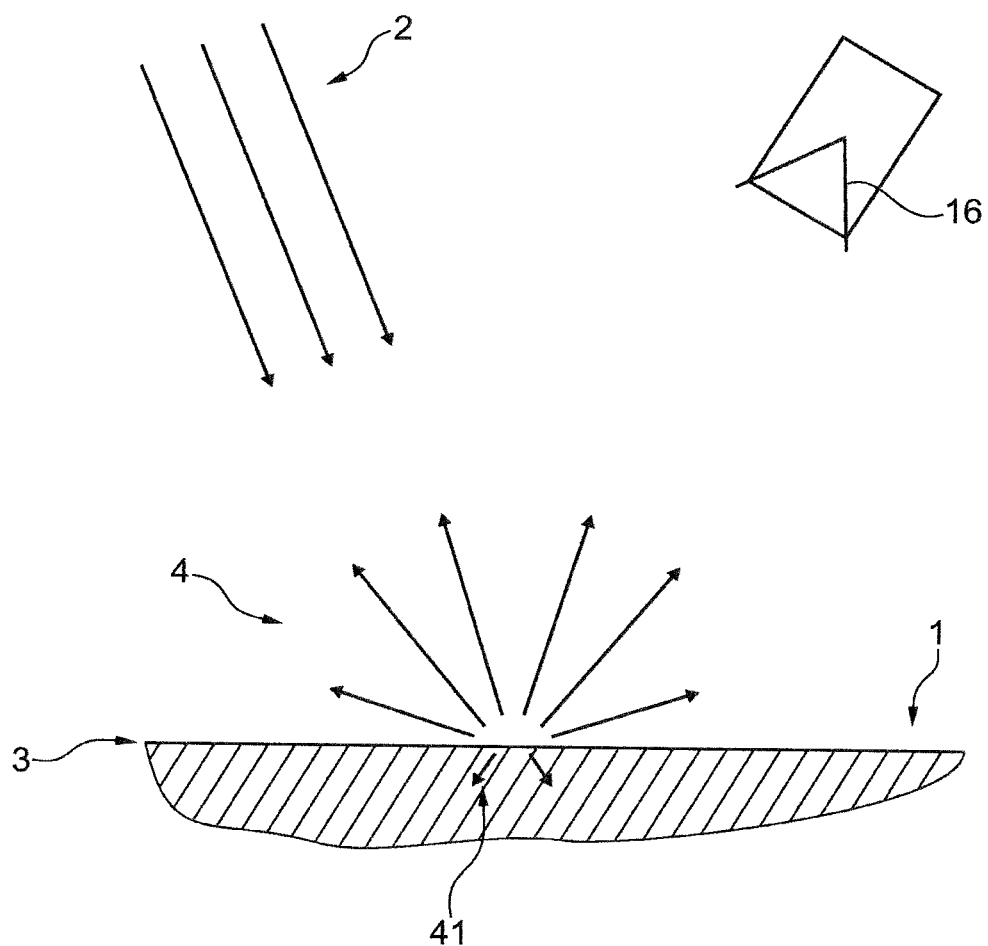
FIG. 1 shows the reflection of light on a product surface.

FIG. 1 elucidates the reflection of light at a product surface 1, which is shown in a cross section. Incident light 2 is incident on the product surface 1. In accordance with the reflection properties of the surface profile 3 (not depicted in any more detail) of the product surface 1, part of the light 41 is absorbed by the product surface 1, another part of the light 4 is cast back, that is, reflected. The intensity of the reflected light 4 depends on the direction and it is influenced by the surface profile 3. The direction and the intensity of the incident light 2, of the absorbed light 41 and of the reflected light 4 are elucidated by the directions and lengths of the arrows. Part of the reflected light 4 reaches a detector 16 of an optoelectronic reader, which detects the intensity of the light in a spatially resolved manner.

Figure 2:
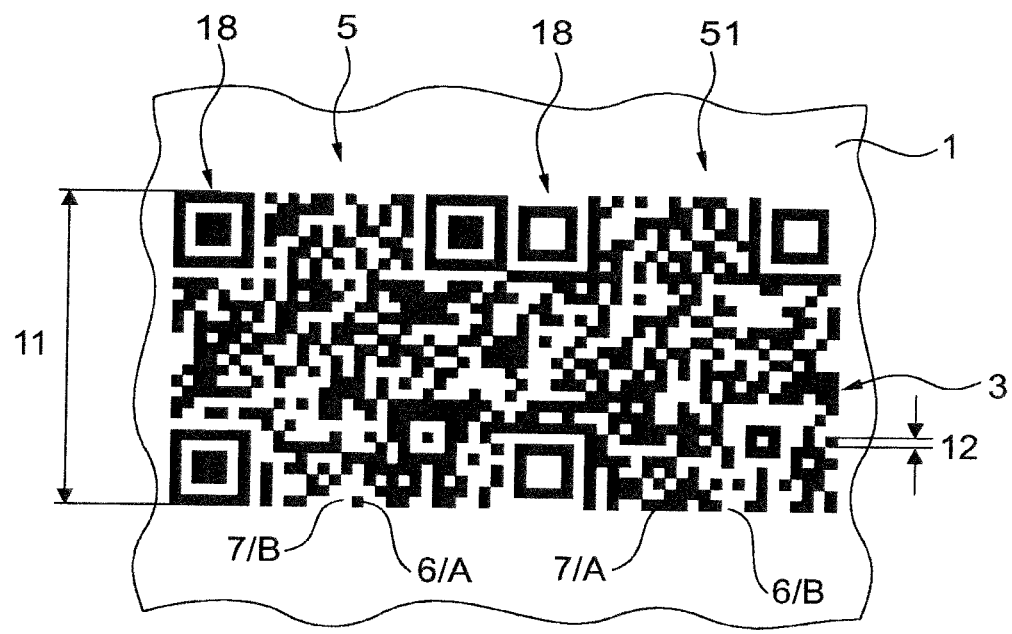
FIGS. 2 and 3 each show a plan view of a product surface comprising two QR codes.
Figure 3:
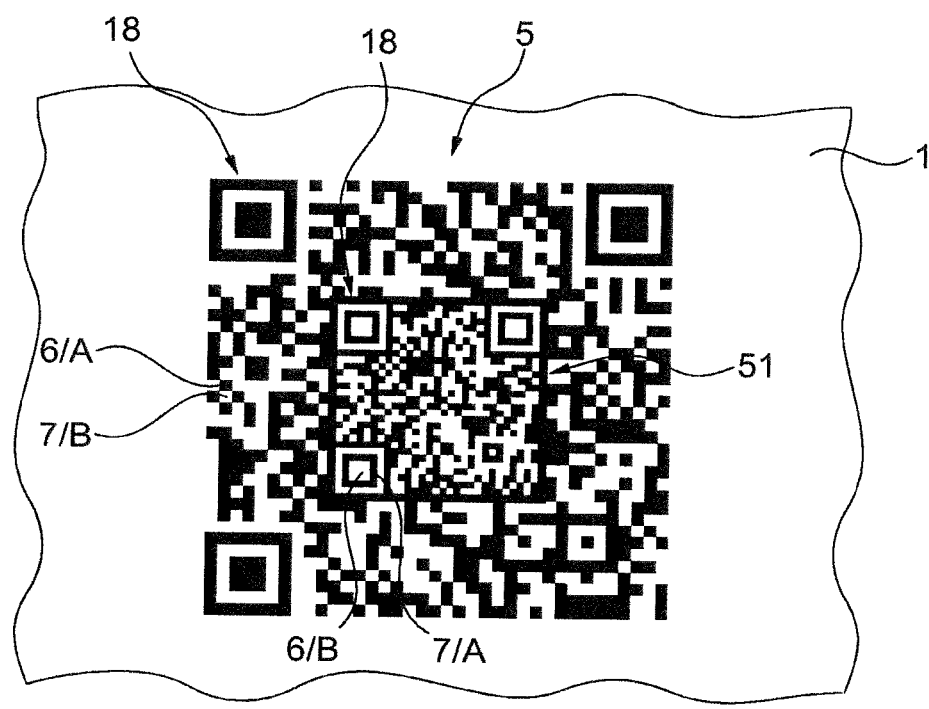

FIGS. 2 and 3 each show a plan view of a product surface 1 having two QR codes 5, 51. The product surface 1 is the surface of a sidewall of a vehicle pneumatic tire. The depicted codes (5, 51) have cells 6 of a first cell type of the respective code (5, 51) and cells 7 of a second cell type of the respective code (5, 51). The cells (6, 7) are in each case an integral constituent of the product surface 1. The cells of the cell types A, that is, the cells 6 of the first code 5 and the cells 7 of the second code 51, have the same surface profile 3 with depressions relative to the product surface 1. The cells of the cell types B, that is, the cells 7 of the first code 5 and the cells 6 of the second code 51, have the same surface profile 3. The surface profile 3 of the cell types A differs in terms of the reflection properties thereof from the surface profile 3 of the cell types B, as a result of which an intensity difference $\Delta I_c$ emerges for each code (5, 51) and the code is optoelectronically readable. The surface profiles 3 of the cell types of both codes (5, 51) are interchanged and there is an inversion of the intensity differences, that is, $\Delta I_1 = -\Delta I_2$ (wherein the assumption of reflection areas with the same surface dimensions is made in each case). The maximum of the positive intensity difference $\Delta I_1 > 0$ of the first code 5 therefore lies in a different reflection direction than the maximum of the positive intensity difference $\Delta I_2 > 0$ of the second code 51. Furthermore, what applies to all possible angles of reflection, in which $\Delta I_1 < 0$ applies to the intensity difference $\Delta I_1$ of the first code 5, is that the intensity difference $\Delta I_2$ of the second code 51 satisfies the condition $\Delta I_2 > 0$.

The codes (5, 51) depicted in FIGS. 2 and 3 each have specific arrangements 18 of cells 6 of the first cell type and cells 7 of the second cell type, the arrangements being of importance for detecting the code by an optoelectronic reader. By way of example, a specific arrangement 18 comprises a square made of nine cells 6, which are surrounded by cells 7 that are in turn surrounded by cells 6. If $\Delta I_c > 0$ applies for the specific arrangements 18 of a QR code, then the code is conventionally identified as a QR code by an optoelectronic reader.

The two codes (5, 51) depicted in FIG. 2 are QR codes with the same coding and error tolerance and are arranged directly adjacent to one another on the product surface 1. The codes (5, 51) are square with an edge length 11 of 2 cm and therefore each take up an area of 4 cm$^2$ on the product surface 1. The cells (6, 7) are square with an edge length 12 of approximately 0.69 mm.

The codes (5, 51) depicted in FIG. 3 are QR codes. The second code 51 takes up a smaller area than the first code 5 and it is integrated into the area of the first code 5. The first code 5 is a design QR code, which has a greater error tolerance than the second code 51, which is a QR code and which at least partly represents the same information as the first code 5.

Figure 4:
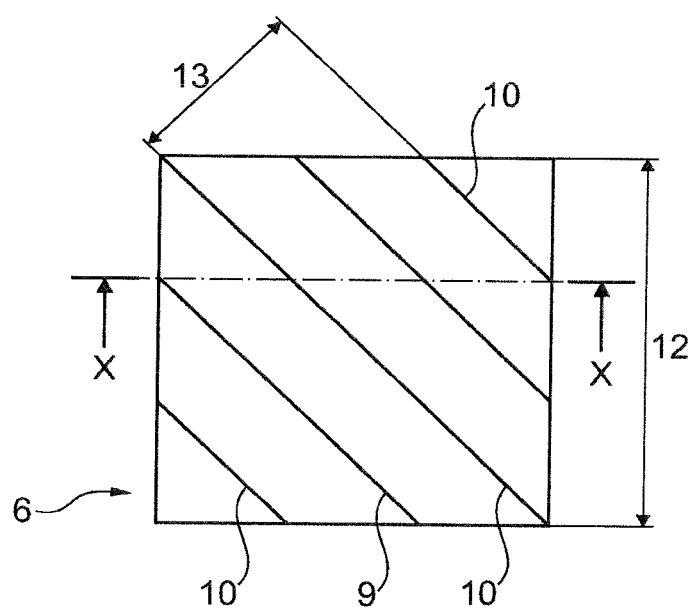
FIG. 4 shows a plan view of a cell.

FIG. 4 shows a plan view of a cell 6 with a surface profile 3 having depressions relative to the product surface 1. When viewed together with FIG. 5, it is possible to identify that the surface profile 3 of the cell 6 has elements 8 which form a structure. The structure is a hatching with regularly arranged webs with a triangular cross section as elements 8. The distance 13 between the element bases 9 and the element tips 10 is 0.24 mm.

Figure 5:
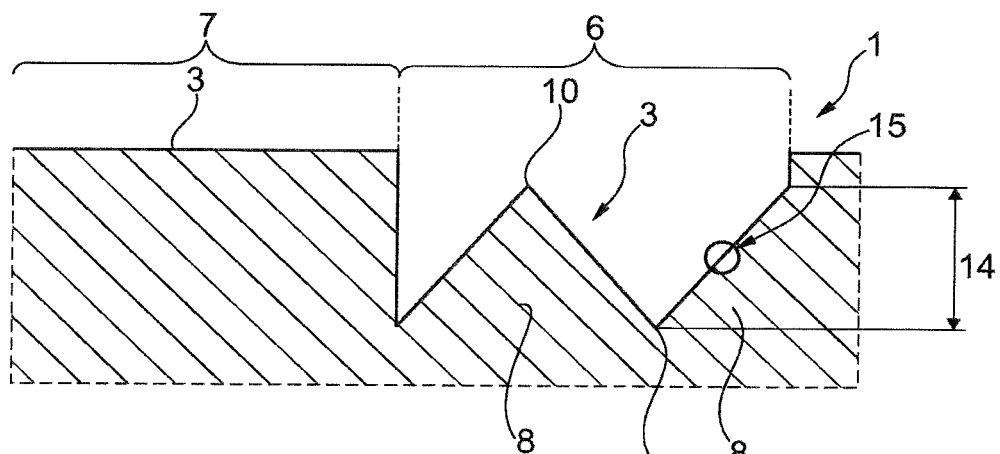
FIG. 5 shows a cross section through two adjacent cells of different cell types.

FIG. 5 shows a cross section along the line X-X through the cell 6 depicted in FIG. 4 and through a cell 7 adjoining it, wherein the two cells differ in terms of the surface profile 3 thereof. In this case, the cell 6 is, for example, a cell 6 of the first cell type and the cell 7 is a cell 7, adjoining it, of the second cell type of the respectively first of the codes 5 shown in FIG. 2 or FIG. 3. With a height difference 14 of 0.2 mm between the element bases 9 and the element tips 10, the surface profile 3 of the cell 6 has a roughness depth of 0.2 mm. The surface of the cell 6 is lowered relative to the product surface 1 by an additional height profile in such a way that the element tips 10 drop below the level of the product surface 1 by 0.05 mm. The surface profile 3 of the cell 7 of the second cell type has a roughness depth of 0.008 mm pursuant to DIN EN ISO 4287:1998. The roughness depth of the surface profile 3 of the cell 6 of the first cell type is therefore greater than the roughness depth of the surface profile 3 of the cell 7 of the second cell type by a factor of 25.

Figure 6:
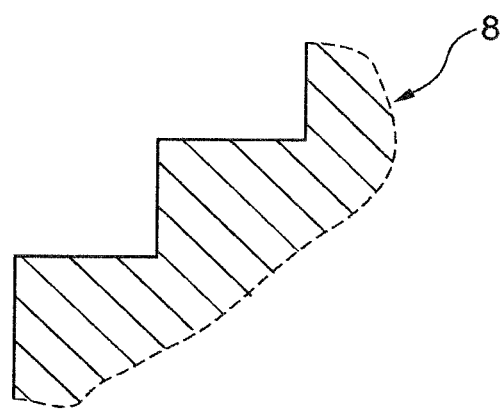
FIG. 6 shows a section of the surface of an element; and,
FIGS. 7 to 10 each show a grayscale representation of the surface profile of a cell in a plan view.

A section 15 of the element 8 from FIG. 5 can be seen in FIG. 6. The surface of the element 8 has a stepped structure with a step height of 0.02 mm.

The reflection properties of the surface profile 3 of the cell 6, depicted in FIGS. 4 to 6, differ significantly from the reflection properties of the surface profile of the cell 7 shown in FIG. 5. The light reflected by the cells (6, 7) can be detected and distinguished by an optoelectronic reader. A code which has two such cell types is therefore readable by an optoelectronic reader.

FIGS. 7 to 10 each show a plan view of further embodiments of a cell 6 of one cell type. Here, the surface profile 3 of each cell 6 is depicted as a grayscale image. A code which has a cell type with one of the surface profiles 3 depicted in FIGS. 7 to 10 and a cell type with the surface profile 3 of the cell 7 shown in FIG. 5 can be read by an optoelectronic reader. A comparison of these combinations showed that a code, the first cell type of which has the surface profile 3 shown in FIG. 8 and the second cell type of which has the surface profile of the cell 7 shown in FIG. 5, leads to the best detection result.

Figure 7:
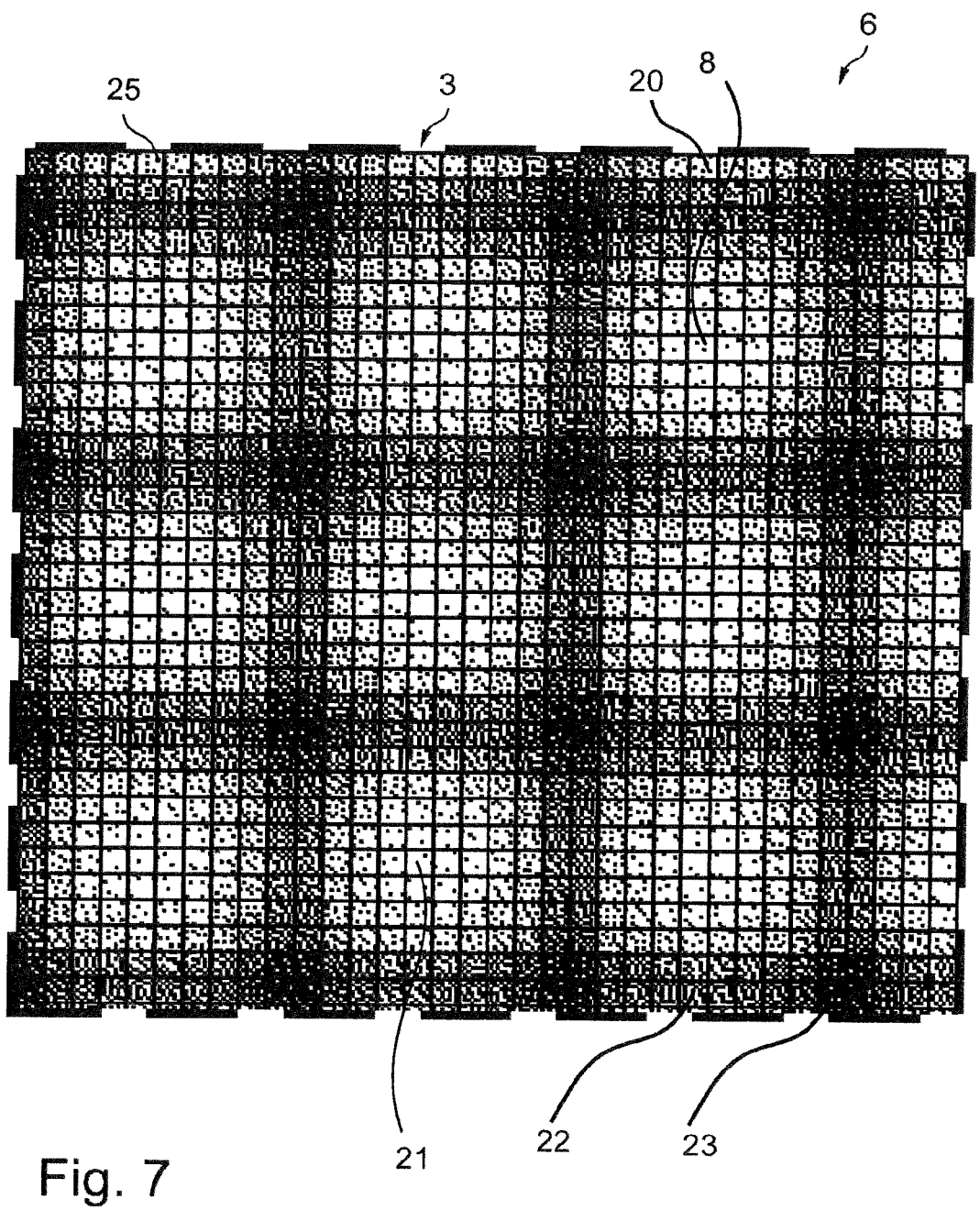
Figure 8:
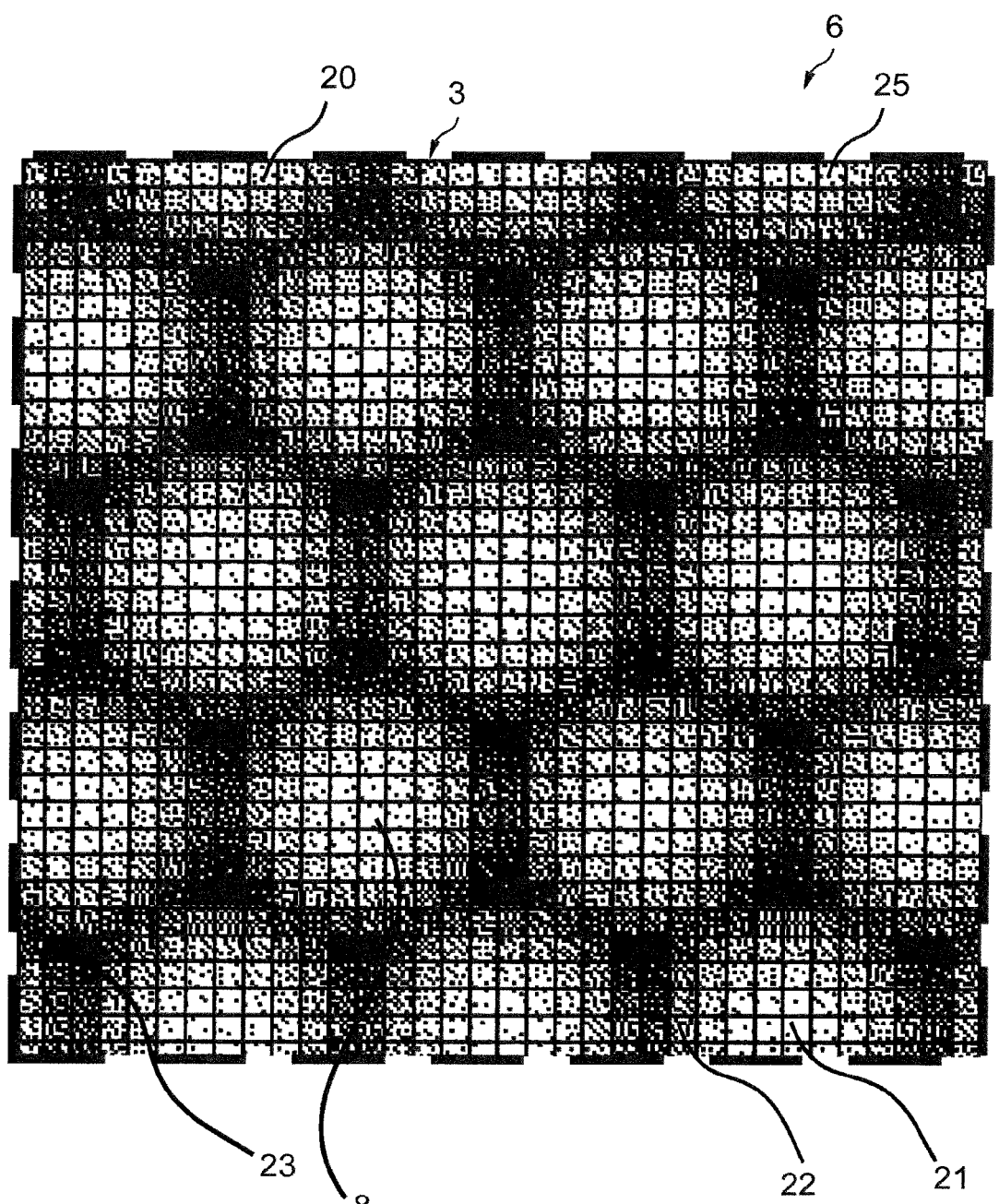

The height of the elevations and/or depressions of the surface profile 3 are depicted by 256 grayscale values in the grayscale image. Black depicts the lowest point and white depicts the highest point of the surface profile 3. In this case, the height difference is 0.2 mm. As a result of the discrete increments in height in accordance with the discrete grayscale values, the elements 8 of the surface profiles 3 have a stepped structure. Such a surface profile 3, or the surface profile with a complementary embodiment thereto, of a forming tool for producing such a surface profile 3 on a product surface 1 can be produced by, for example, laser engraving. In FIGS. 7, 8 and 10, the edge length of each pixel 20 is 0.02 mm; in FIG. 9, the edge length of each pixel 20 is 0.04 mm.

Therefore, each pixel 20 has a constant height which is represented by the grayscale value. The grayscale value of each pixel 20 is represented in this case by the accumulated area of the black fields 25 within the pixel 20. In particular, the fields 25 are rectangles. By way of example, it can clearly be identified that the pixel 21 has a significantly smaller accumulated area of the fields 25 than the pixel 22 in each case. Therefore, a lower (brighter) grayscale value should be assigned to the pixel 21 than to the pixel 22. Therefore, the pixel 21 has a greater height in the surface profile 3 than the pixel 22. Furthermore, in FIGS. 6 to 9, the pixel 23 has a significantly greater accumulated area of the fields 25 than the pixel 22 in each case. Therefore, a higher (darker) grayscale value should be assigned to the pixel 23 than to the pixel 22. The pixel 23 therefore has a lower height in the surface profile 3 than the pixel 22. The pixel 20 with the smallest accumulated area of the fields 25 is assigned the grayscale value of white; the pixel 20 with the greatest accumulated area of the fields 25 is assigned the grayscale value of black.

The surface profile 3 depicted in FIG. 7 as a grayscale value image has a structure, the elements 8 of which are arranged in a rectangular grid.

The surface profile 3 depicted in FIG. 8 as a grayscale value image has a structure with elements 8 arranged offset from one another.

Figure 9:
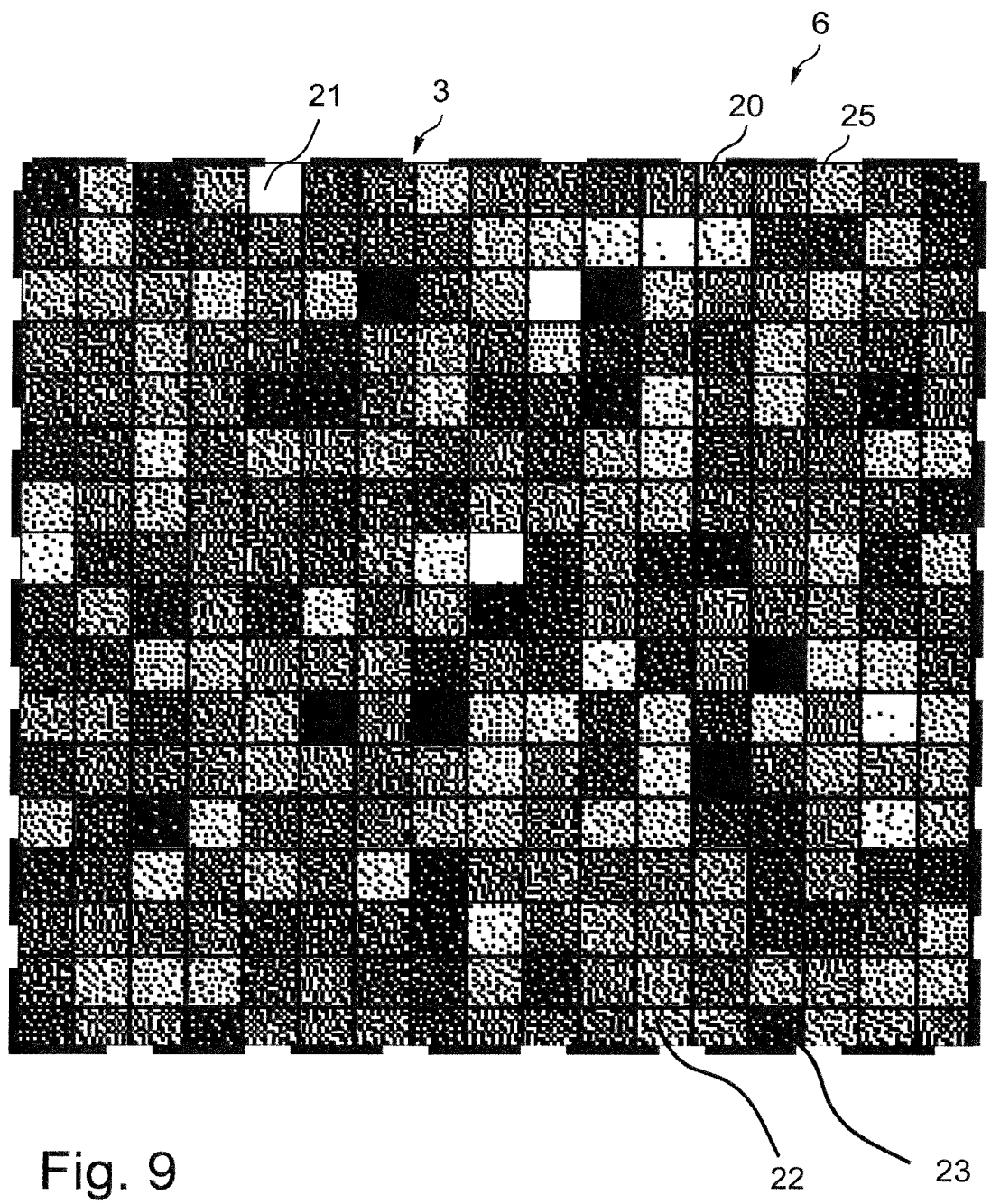
Figure 10:
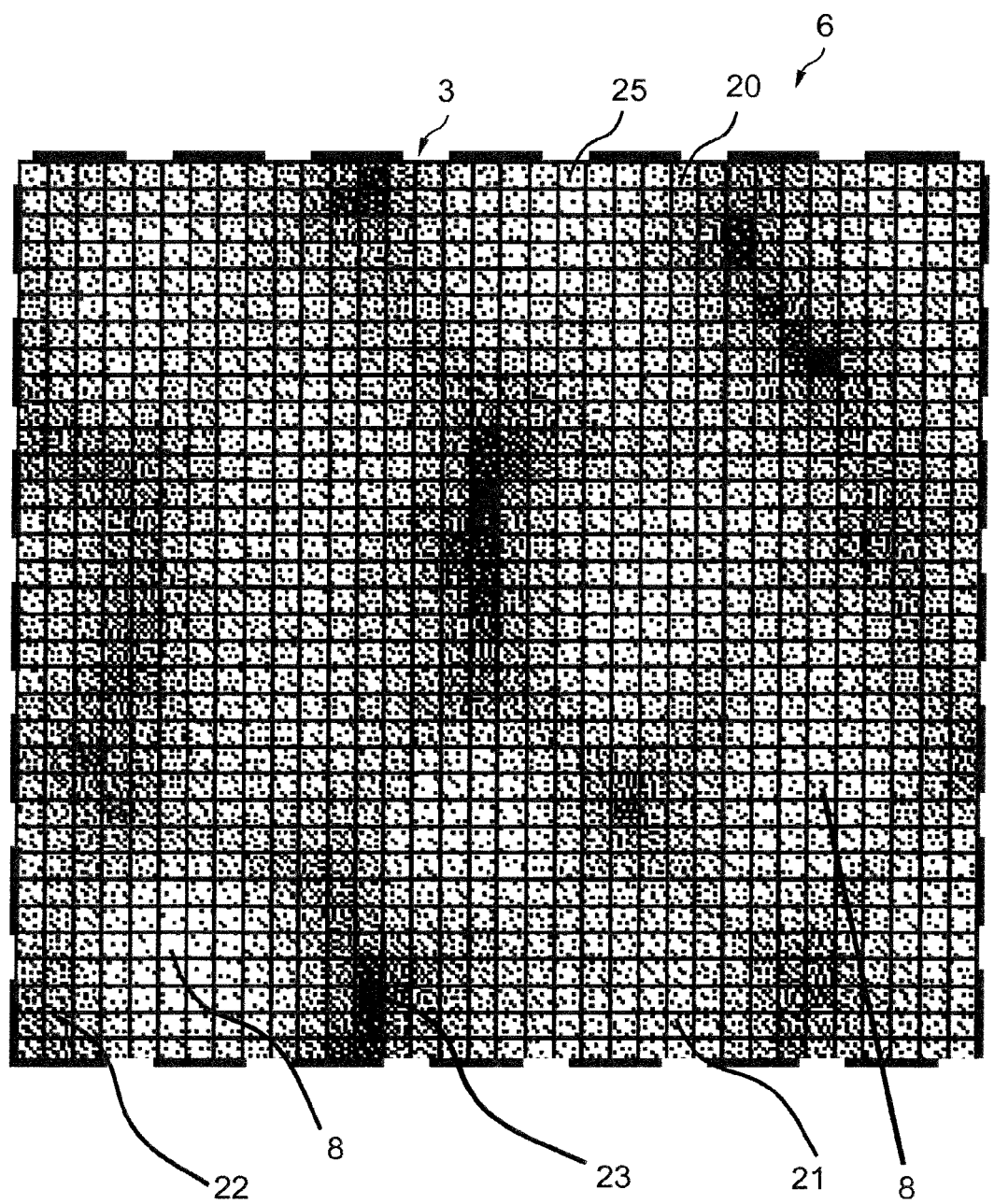

The surface profile 3 depicted in FIG. 9 as a grayscale value image has a texture, with the height of the pixels 20 being distributed statistically.

The surface profile 3 depicted in FIG. 10 as a grayscale value image has a texture, with form and distribution of the elements 8 being irregular.

It is understood that the foregoing description is that of the preferred embodiments of the invention and that various changes and modifications may be made thereto without departing from the spirit and scope of the invention as defined in the appended claims.

LIST OF REFERENCE SIGNS

Part of the Description

1 Product surface
2 Incident light
3 Surface profile
3 Absorbed light
4 Reflected light
5 First code
6 Second code
6 Cell of a (first) cell type
7 Cell of a (second) cell type
8 Element
9 Element base
10 Element tip
11 Edge length of a code
12 Edge length of a cell
13 Distance
14 Height difference 15 Section
16 Detector
18 Specific arrangement
20 Pixel
21, 22, 23 Pixel
25 Field

What is claimed is:

1. A product surface comprising:
a first optoelectronically readable code formed by a plurality of first planar cells of a first cell type and a plurality of second planar cells of a second cell type;
said first and second planar cells being integral components of the product surface;
said first planar cells having a first surface profile;
said second planar cells having a second surface profile;
at least one of said first and said second surface profiles having at least one of a depression and an elevation with respect to the product surface;
said first surface profile of said first cell type being configured relative to said second surface profile of said second cell type such that said first surface profile has first reflection properties configured to reflect at a first reflection intensity $I_1$ when light is incident and said second surface profile has second reflection properties configured to reflect at a second reflection intensity $I_2$ when light is incident;
said second reflection properties differing from said first reflection properties such that a first intensity difference $\Delta I_1 = I_2 - I_1$ results when light is incident;
a second optoelectronically readable code formed by a plurality of third planar cells of a third cell type and a plurality of fourth planar cells of a fourth cell type;
said third and fourth planar cells being integral components of the product surface;
said third planar cells having a third surface profile;
said fourth planar cells having a fourth surface profile;
at least one of said third and said fourth surface profiles having at least one of a depression and an elevation with respect to the product surface;
said third surface profile of said third cell type being configured relative to said fourth surface profile of said fourth cell type such that said third surface profile has third reflection properties configured to reflect at a third reflection intensity $I_1$ when light is incident and said fourth surface profile has fourth reflection properties configured to reflect at a fourth reflection intensity $I_4$ when light is incident;
said fourth reflection properties differing from said third reflection properties such that a second intensity difference $\Delta I_2 = I_4 - I_3$ results when light is incident;
said first and second surface profiles of said first optoelectronically readable code defining a first maximum absolute intensity difference $|\Delta I_1|$;
said third and said fourth surface profiles of said second optoelectronically readable code defining a second maximum absolute intensity difference $|\Delta I_2|$; and,
said first maximum absolute intensity difference $|\Delta I_2|$ lying in a different direction of reflection than said second maximum absolute intensity difference $|\Delta I_2|$.

2. The product surface of claim 1, wherein said first and said second surface profiles of said first optoelectronically readable code and said third and fourth surface profiles of said second optoelectronically readable code are configured such that a maximum of a positive intensity difference $\Delta I_1 > 0$ of said first optoelectronically readable code lies in a different direction of reflection than a maximum of a positive intensity difference $\Delta I_2 > 0$.

3. The product surface of claim 2, wherein said first and said second cell types of said first optoelectronically readable code and said third and fourth cell types of said second optoelectronically readable code are configured such that the condition $\Delta I_2 > 0$ for said second intensity difference $\Delta I_2$ is fulfilled for at least 50% of the possible reflection angles in which $\Delta I_1 \leq 0$ applies for said first intensity difference $\Delta I_1$ of said first optoelectronically readable code.

4. The product surface of claim 2, wherein said first and said second cell types of said first optoelectronically readable code and said third and fourth cell types of said second optoelectronically readable code are configured such that the condition $\Delta I_2 > 0$ for said second intensity difference $\Delta I_2$ is fulfilled for at least 80% of the possible reflection angles in which $\Delta I_1 \leq 0$ applies for said first intensity difference $\Delta I_1$ of said first optoelectronically readable code.

5. The product surface of claim 1, wherein said first and said second optoelectronically readable codes are both one dimensional codes or are both two dimensional codes.

6. The product surface of claim 1, wherein said first and said second optoelectronically readable codes are both barcodes or are both quick response codes.

7. The product surface of claim 1, wherein said first and said second optoelectronically readable codes both at least partly represent the same information.

8. The product surface of claim 1, wherein said first and said second optoelectronically readable codes are arranged mutually adjacent on the product surface.

9. The product surface of claim 1, wherein:
said first optoelectronically readable code defines a first area;
said second optoelectronically readable code defines a second area;
said second area is smaller than said first area; and,
said second optoelectronically readable code is integrated in said first area of said first optoelectronically readable code.

10. The product surface of claim 1, wherein:
said first surface profile and said fourth surface profile are the same; and,
said second surface profile and said third surface profile are the same.

11. The product surface of claim 10, wherein:
the product surface defines a plane; and,
said first and said fourth surface profiles are rotated by 90° in said plane of the product surface relative to said second and said third surface profiles.

12. The product surface of claim 1, wherein one of said first, second, third and fourth surface profiles has elements forming at least one of a structure and a texture.

13. The product surface of claim 1, wherein:
said first surface profile has a first roughness depth;
said second surface profile has a second roughness depth differing from said first roughness depth;
said third surface profile has a third roughness depth; and,
said fourth surface profile has a fourth roughness depth differing from said third roughness depth.

14. The product surface of claim 1, wherein:
said first surface profile has a first roughness depth;
said second surface profile has a second roughness depth; and,
said first and said second roughness depths define a ratio of 15 from one to the other.

15. The product surface of claim 1, wherein:
said first surface profile has a first roughness depth;
said second surface profile has a second roughness depth; and, said first and said second roughness depths define a ratio of 30 from one to the other.

16. The product surface of claim 1, wherein the product surface is formed from a polymeric material.

17. The product surface of claim 1, wherein the product surface is formed from an elastomeric material.

18. A pneumatic vehicle tire comprising:
a side wall having a product surface;
said product surface including a first optoelectronically readable code formed by a plurality of first planar cells of a first cell type and a plurality of second planar cells of a second cell type;
said first and second planar cells being integral components of said product surface;
said first planar cells having a first surface profile;
said second planar cells having a second surface profile;
at least one of said first and said second surface profiles having at least one of a depression and an elevation with respect to said product surface;
said first surface profile of said first cell type being configured relative to said second surface profile of said second cell type such that said first surface profile has first reflection properties configured to reflect at a first reflection intensity $I_1$ when light is incident and said second surface profile has second reflection properties configured to reflect at a second reflection intensity $I_2$ when light is incident;
said second reflection properties differing from said first reflection properties such that a first intensity difference $\Delta I_1 = I_2 - I_1$ results when light is incident;
said product surface further including a second optoelectronically readable code formed by a plurality of third planar cells of a third cell type and a plurality of fourth planar cells of a fourth cell type;
said third and fourth planar cells being integral components of said product surface;
said third planar cells having a third surface profile;
said fourth planar cells having a fourth surface profile;
at least one of said third and said fourth surface profiles having at least one of a depression and an elevation with respect to said product surface;
said third surface profile of said third cell type being configured relative to said fourth surface profile of said fourth cell type such that said third surface profile has third reflection properties configured to reflect at a third reflection intensity $I_3$ when light is incident and said fourth surface profile has fourth reflection properties configured to reflect at a fourth reflection intensity $I_4$ when light is incident;
said fourth reflection properties differing from said third reflection properties such that a second intensity difference $\Delta I_2 = I_4 - I_3$ results when light is incident;
said first and second surface profiles of said first optoelectronically readable code defining a first maximum absolute intensity difference $|\Delta I_1|$;
said third and said fourth surface profiles of said second optoelectronically readable code defining a second maximum absolute intensity difference $|\Delta I_2|$; and,
said first maximum absolute intensity difference $|\Delta I_1|$ lying in a different direction of reflection than said second maximum absolute intensity difference $|\Delta I_2|$.

19. A conveyor belt comprising:
a belt body having a product surface;
said product surface including a first optoelectronically readable code formed by a plurality of first planar cells of a first cell type and a plurality of second planar cells of a second cell type;
said first and second planar cells being integral components of said product surface;
said first planar cells having a first surface profile;
said second planar cells having a second surface profile;
at least one of said first and said second surface profiles having at least one of a depression and an elevation with respect to said product surface;
said first surface profile of said first cell type being configured relative to said second surface profile of said second cell type such that said first surface profile has first reflection properties configured to reflect at a first reflection intensity $I_1$ when light is incident and said second surface profile has second reflection properties configured to reflect at a second reflection intensity $I_1$ when light is incident;
said second reflection properties differing from said first reflection properties such that a first intensity difference $\Delta I_1 = I_2 - I_1$ results when light is incident;
said product surface further including a second optoelectronically readable code formed by a plurality of third planar cells of a third cell type and a plurality of fourth planar cells of a fourth cell type;
said third and fourth planar cells being integral components of said product surface;
said third planar cells having a third surface profile;
said fourth planar cells having a fourth surface profile;
at least one of said third and said fourth surface profiles having at least one of a depression and an elevation with respect to said product surface;
said third surface profile of said third cell type being configured relative to said fourth surface profile of said fourth cell type such that said third surface profile has third reflection properties configured to reflect at a third reflection intensity $I_3$ when light is incident and said fourth surface profile has fourth reflection properties configured to reflect at a fourth reflection intensity $I_4$ when light is incident;
said fourth reflection properties differing from said third reflection properties such that a second intensity difference $\Delta I_2 = I_4 - I_3$ results when light is incident;
said first and second surface profiles of said first optoelectronically readable code defining a first maximum absolute intensity difference $|\Delta I_1|$;
said third and said fourth surface profiles of said second optoelectronically readable code defining a second maximum absolute intensity difference $|\Delta I_2|$; and,
said first maximum absolute intensity difference $|\Delta I_1|$ lying in a different direction of reflection than said second maximum absolute intensity difference $|\Delta I_2|$.

\* \* \* \* \*

UNITED STATES PATENT AND TRADEMARK OFFICE
CERTIFICATE OF CORRECTION

PATENT NO. : 9,524,454 B2  
APPLICATION NO. : 15/138060  
DATED : December 20, 2016  
INVENTOR(S) : M. Metz et al.

Page 1 of 1

It is certified that error appears in the above-identified patent and that said Letters Patent is hereby corrected as shown below:

In the Specification

In Column 10:  
Line 55: delete "3 Absorbed light" and substitute -- 41 Absorbed light -- therefor.

In Column 10:  
Line 58: delete "6 Second code" and substitute -- 51 Second code -- therefor.

In the Claims

In Column 11:  
Line 44: delete "$I_1$" and substitute -- $I_3$ -- therefor.

In Column 11:  
Line 57: delete "$|\Delta I_2|$" and substitute -- $|\Delta I_1|$ -- therefor.

In Column 14:  
Line 23: delete "$I_1$" and substitute -- $I_2$ -- therefor.

Signed and Sealed this  
Ninth Day of May, 2017

Michelle K. Lee  
*Director of the United States Patent and Trademark Office*